United States Patent [19]

Harrington

[11] Patent Number: 4,611,662
[45] Date of Patent: Sep. 16, 1986

[54] REMOTELY OPERABLE RELEASABLE PIPE CONNECTOR

[75] Inventor: John P. Harrington, Houston, Tex.

[73] Assignee: Amoco Corporation, Chicago, Ill.

[21] Appl. No.: 736,595

[22] Filed: May 21, 1985

[51] Int. Cl.[4] .................... E21B 7/20; E21B 17/046; E21B 17/06

[52] U.S. Cl. ................... 166/339; 166/242; 166/340; 166/358; 166/365; 175/171; 175/320; 285/3; 285/402

[58] Field of Search ............... 166/338, 340, 341, 358, 166/240, 242, 339, 365; 175/320, 171, 7, 22; 285/2, 3, 4, 361, 396, 402, 27; 405/170, 224, 251

[56] References Cited

U.S. PATENT DOCUMENTS

| | | | |
|---|---|---|---|
| 2,591,531 | 4/1952 | Fishback | 285/27 |
| 2,698,761 | 1/1955 | Claypool et al. | 285/3 |
| 2,736,384 | 2/1956 | Potts | 285/361 |
| 3,153,547 | 10/1964 | Chancellor et al. | 285/402 |
| 3,262,508 | 7/1966 | Price | 175/171 |
| 3,345,826 | 10/1967 | Hignite | 166/240 |
| 3,376,922 | 4/1968 | Leonhardt, Jr. | 175/320 |
| 3,973,635 | 8/1976 | Gatlin et al. | 166/358 |
| 4,293,146 | 10/1981 | Beynet et al. | 285/361 |
| 4,474,243 | 10/1984 | Gaines | 166/362 |

FOREIGN PATENT DOCUMENTS

| | | | |
|---|---|---|---|
| 1097929 | 1/1961 | Fed. Rep. of Germany | 285/402 |
| 1340394 | 12/1973 | United Kingdom | 405/224 |
| 861556 | 9/1981 | U.S.S.R. | 166/242 |

Primary Examiner—James A. Leppink
Assistant Examiner—Hoang C. Dang
Attorney, Agent, or Firm—Scott H. Brown; Fred E. Hook

[57] ABSTRACT

A remotely releasable pipe connector is described and comprises a first tubular connector or "pin connector" having at least one laterally extending locking member, and a slotted second tubular connector or "box connector" cooperatively disposable over the first tubular connector with the slots thereof removably engaging the first tubulars connector's locking members. One or more shear plates are attachable to the second tubular connector and are positioned to prevent the release of the locking members from the slots in the second tubular connector until the shear plates are subjected to a force greater than or equal to a predetermined force.

1 Claim, 6 Drawing Figures

REMOTELY OPERABLE RELEASABLE PIPE CONNECTOR

BACKGROUND OF THE INVENTION

1. Field of the Invention

The present invention relates to remotely releasable pipe connectors, and more particularly, but not by way of limitation, to a remotely releasable pipe connector for use in setting conductor casing into the sea floor as used in the drilling of offshore wells.

2. Setting of the Invention

In the drilling of offshore oil and gas wells, a length of conductor casing is often driven into the sea floor from a barge or platform located on the surface. This conductor casing is usually of a large diameter; i.e., about 20 in. to over 30 in. Once installed, a continuous string of pipe, often referred to as a riser, is set within the conductor casing and extends to the surface. Drilling, completion and other well operations are carried out by drill pipe, tools, etc., passed through and contained within the riser.

In more detail, when the conductor casing is driven in a batch casing driving operation, such as through a subsea template, the conductor casing driven into the sea floor must be disconnected from the string of pipe above it at a certain point above the sea floor. Heretofore, this disconnection procedure has been carried out by either divers cutting the casing, which often requires from about four to six hours of actual underwater time for the divers and the expense associated therewith, or the use of hydraulically or wireline releasable conductor connectors, again which requires divers. Frequently, when divers are used, the connector fails to correctly disconnect because of improper operation of the release mechanism or by current induced bending moments.

Also, if the conductor casing is cut, there is no commercially available reconnection device to allow for simple reentry of the well. When this occurs, the casing must be cut which requires additional time and expense.

Several remotely operable pipe connectors which are operated mechanically or hydraulically from the surface to cause the release of the connector have been utilized heretofore. However such connectors are expensive and require either a cable or a hydraulic fluid hose which extends from the pipe connector to the surface. The presence of a cable or hose introduces casing string handling problems and protracts casing running time resulting in a significant extra expense.

While tubular pin and box pipe connectors including complementary locking dogs and slots which can be engaged or disengaged by relative movement between the pin and box have been known and used heretofore, such connectors are subject to being unintentionally disconnected during the manipulation of a string of pipe in which they are contained and their use has thus been limited.

There is a need for a remotely operable releasable pipe connector which does not require the use of divers or cables or hydraulic hoses. Further, there is a need for such a pipe connector which can withstand the forces needed to drive a surface casing into the sea floor.

SUMMARY OF THE INVENTION

The present invention is contemplated to overcome the foregoing deficiencies and meet the abovedescribed needs. The present invention is a remotely releasable pipe connector having a first tubular connector attached at one end of a length of pipe or casing and a cooperative second tubular connector attached at one end of a second length of pipe or casing. The first tubular connector has at least one laterally extending member or dog which is (are) received into respective slot(s) in the second tubular connector when the second tubular connector is disposed over the first tubular connector. At least one shear plate is attachable to the second tubular connector across the at least one slot to retain the at least one laterally extending member therein until subjected to a force greater than or equal to a predetermined value. When the remotely releasable pipe connector is to be released, the second tubular connector is rotated relative to the first tubular connector with sufficient force to cause the at least one laterally extending member to shear the shear plate, and the second tubular connector is thereafter removed from being disposed over the first tubular connector.

DETAILED DESCRIPTION OF THE PREFERRED EMBODIMENT

Figure 1:
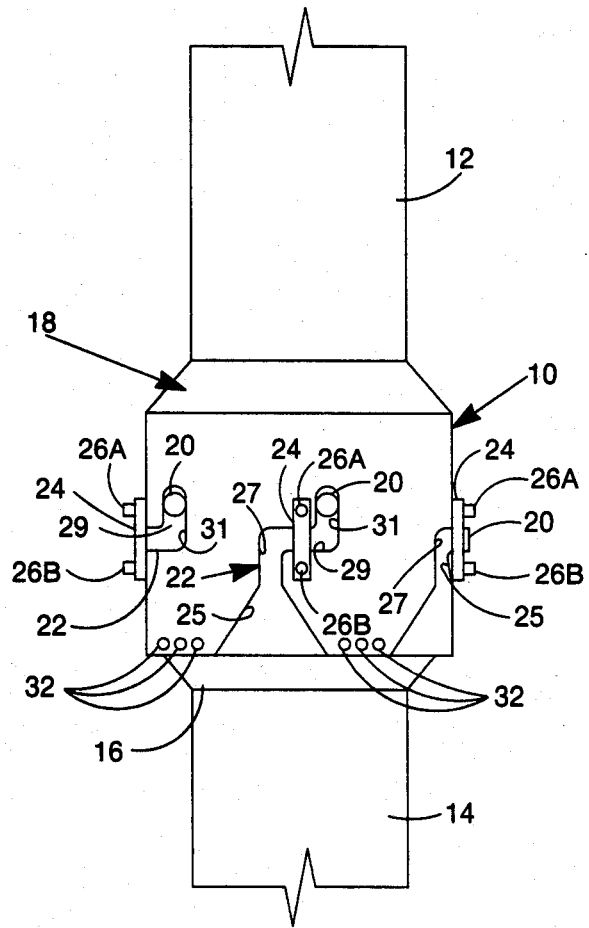
FIG. 1 is a side elevational view of a remotely releasable pipe connector of the present invention attached to pipe sections.

The present invention provides a remotely releasable pipe connector comprising a first tubular connector having at least one laterally extending member attached thereto, a second tubular connector disposable over the first tubular connector and having at least one slot therein for removable engagement with the at least one laterally extending member; and at least one shear plate attachable to the second tubular connector for preventing the release of the at least one laterally extending locking member from the slot until the shear plate is subjected to a force greater than or equal to a predetermined value.

Referring now to the drawings, the remotely releasable pipe connector of the present invention is generally designated by the numeral 10 and is illustrated as connected to an upper and a lower pipe or, specifically, large diameter conductor casing sections 12 and 14, respectively. The pipe connector 10 is comprised of a first tubular connector or pin connector 16 welded or otherwise sealingly attached to the pipe section 14, and a second tubular connector or box connector 18 connected to the pipe section 12. The pin connector 16 includes at least one, and preferably a plurality of laterally extending locking members or dogs 20. Four locking members 20 spaced 90° apart have been found to be satisfactory. The box connector 18 includes a like number or more slots 22 for removably engaging the locking members 20.

While the slots 22 can take various forms, each preferably extends through a side wall portion of the box connector 18 and includes an enlarged open guide portion 25 at the bottom end of the box connector 18. The lower portion of each slot 22 is connected to a vertical portion 27 which is in turn connected to a horizontal portion 29 by rounded connections. The horizontal portion 29 is connected to a second vertical portion 31 by a rounded connection. The slots 22 of the above-described configuration are hereinafter referred to as Z-slots. However, as will be understood by those skilled in the art, a variety of other slot configurations, such as L, J, or N slots can also be used in accordance with the present invention.

Figure 2:
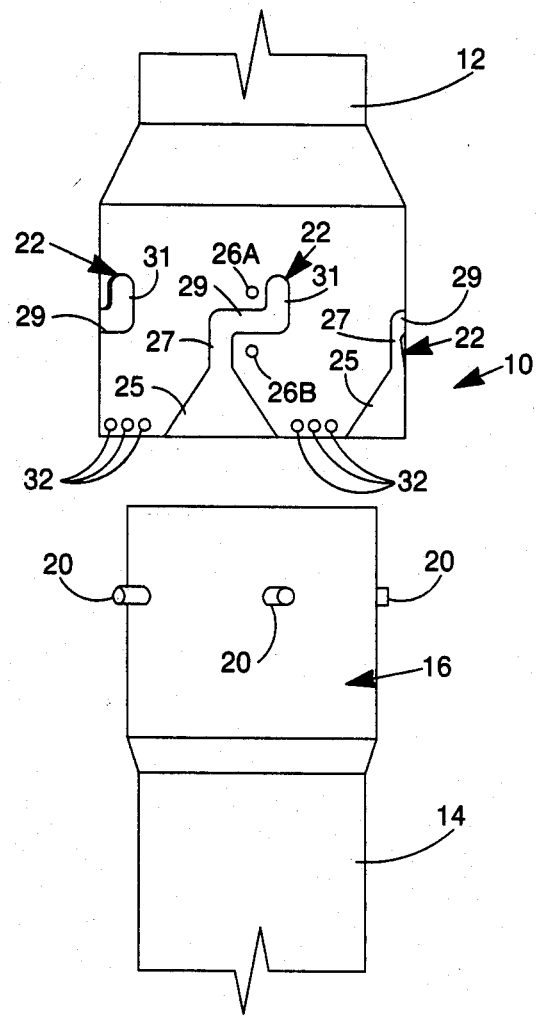
FIG. 2 is a side elevational view of the pipe connector and riser sections of FIG. 1 after the connector has been released.

As shown in FIGS. 1 and 2, the connector 10 is assembled with the box connector 18 coaxially disposed over the pin connector 16. The locking members 20 are positioned within the Z-slots 22 of the box connector 18 by axial and rotational movement of the box connector 18 relative to the pin connector 16.

A shear plate 24 is positioned across at least one, and preferably each of the slots 22 and is used for retaining a locking member 20. Preferably, the plates 24 extend vertically across the horizontal portions 29 of each of the slots 22, whereby the locking members 20 engaged by the slots are prevented from being removed therefrom by the shear plates 24. That is, the locking members 20 are each of a length such that when the box connector 18 is disposed over the pin connector 16 with the locking members 20 within the slots 22, the locking members 20 extend through the slots and beyond the exterior surface of the box connector 18 whereby they can contact and are prevented from moving further through the slots 22 by the shear plates 24. Each of the shear plates 24 can be welded to or bolted to the exterior surface of the box connector 18. Preferably, the shear plates 24 are retained by a pair of bolts 26A and 26B which engage threaded bores disposed in the box connector 18 (not shown). While the shear plates 24 can be formed from any desirable shearable material, such as steel or brass, preferably the shear plates 24 are not designed to shear or fail themselves but that either bolt 26A or 26B is formed from a shearable material, such as brass, so that the shear plates 24 are reused.

Figure 4:
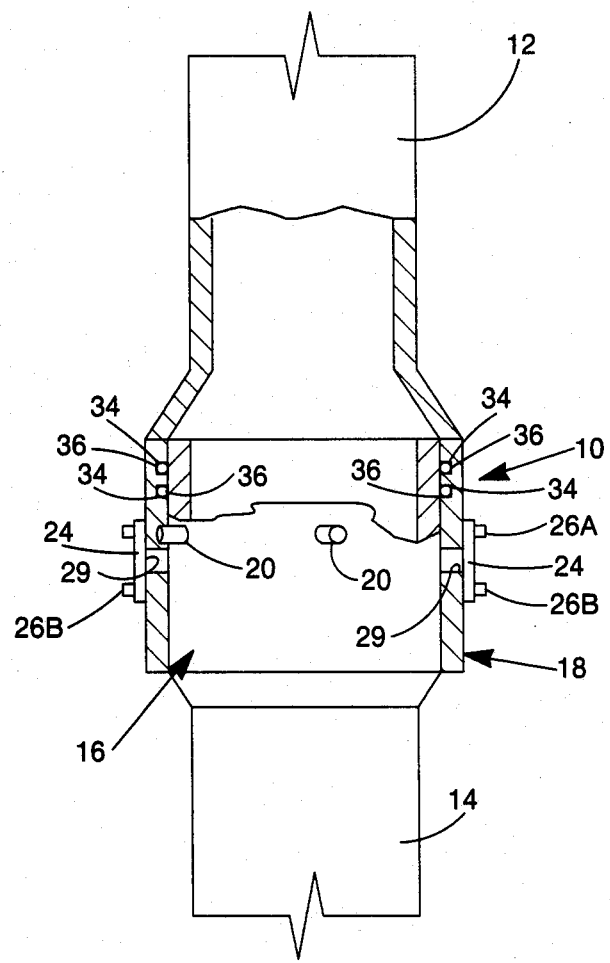
FIG. 4 is a side, partly sectional view of the remotely releasable pipe connector of FIG. 1.

As shown best in FIG. 4, the connector 10 preferably includes two or more annular horizontal grooves 34 disposed interiorly of the box connector 18 with resilient O-ring type seal members 36 positioned therein. The inclusion of the grooves and O-ring seal members in the connector 10 insures a fluid-tight seal between the external surfaces of the pin connector 16 and the internal surfaces of the box connector 18 for the passage of fluids to and from the interior of the conductor casing sections 12/14.

Figure 3:
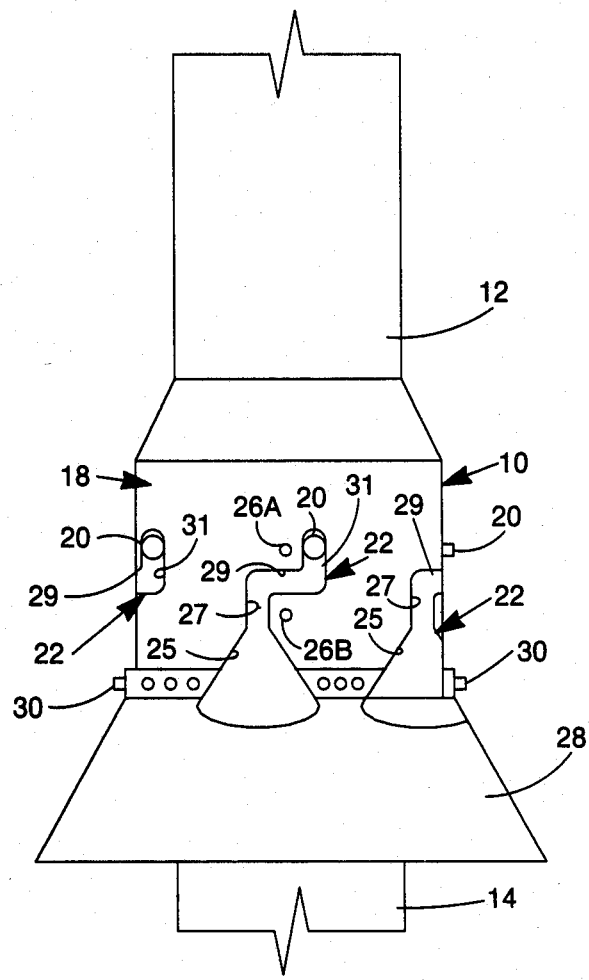
FIG. 3 is a side elevational view of the pipe connector and riser sections of FIGS. 1 and 2 after a guide skirt has been attached thereto and the connector has been reconnected.

To facilitate reconnection of the connector 10, a guide skirt 28 (FIG. 3) can be attached to a lower portion of the box connector 18 by means of a plurality of bolts 30 engaged in a plurality of threaded bores 32 disposed in the connector box 18. The guide skirt 28 facilitates the replacement of the box connector 18 over the pin connector 16 with the locking members 20 thereof engaged within the slots 22 of the box connector 18, as is well apparent to those skilled in the art.

A method of using the connector 10 will be disclosed below. After a subsea template has been landed on the sea floor beneath a drill ship, barge, or platform, the wells are to be drilled through the conductor casing using a mud line suspension system, as is well known in the art. On the surface the box connector 18 is brought into engagement with an oil covered pin connector 16. The locking members 20 are located within the slots 22 by manipulating the casing string as is well known in the art. The shear plates 24 are bolted in place and the conductor casing is lowered to the sea floor through a guide slot in the subsea template. The conductor casing is then driven into the sea floor by pile driving means or, preferably, by reciprocal movement of the suspended conductor casing and thereby allowing the weight of the conductor casing to provide the driving force. The driving forces are born by a load shoulder in the upper portion of the box connector 18. Each conductor casing is driven until it is a few feet above the template, and then released.

Figure 5:
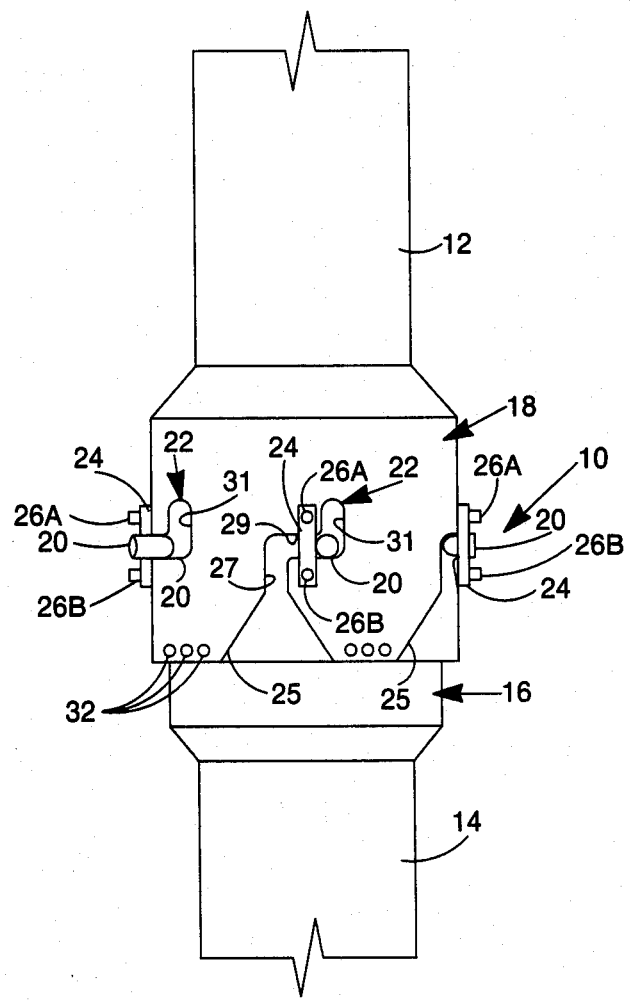
FIG. 5 is a side elevational view of the pipe connector of FIG. 1 after a first step of the operation for release of the pipe connector has been carried out.
Figure 6:
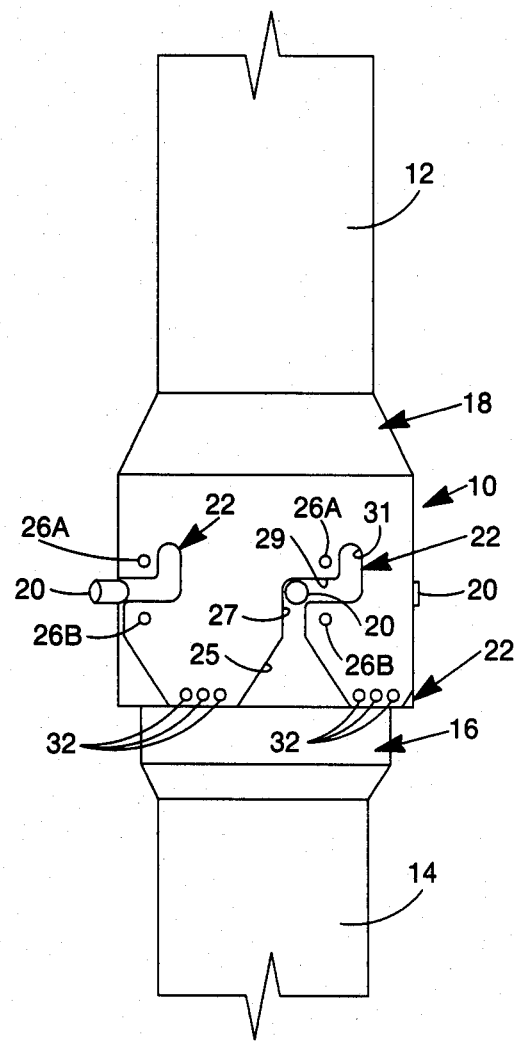
FIG. 6 is a side elevational view of the pipe connector of FIG. 5 after a second step of the operation for the release of the pipe connector has been carried out.

When it is desired to remotely release the connector 10, the pin connector and box connectors are moved relative to each other by moving the casing sections 12 and 14 relative to each other. That is, the casing section 14 is generally in a fixed position, as for example when it has been driven into the sea floor, and the relative movement between it and the casing section 12 is accomplished by moving the casing section 12 only. More specifically, the casing section 12 and the string of pipe attached there-above are moved upwardly so that the box connector 18 is moved upwardly relative to the pin connector 16 and the locking members 20 are moved to the bottoms of the vertical portions 31 of the slots 22 as shown in FIG. 5. The casing section 12 is next rotated counterclockwise so that the locking members 20 are brought into contact with the shear plates 24. Rotational force is applied until force equal to or greater than that required to cause the shear plates 24 to release is exerted thereon by the locking members 20 whereupon the locking members 20 are moved to the tops of the vertical portions 27 of the slots 22 as shown in FIG. 6. Thereafter, the release of the connector 10 is completed by raising the pipe section 12 and the box connector 18, as illustrated in FIG. 2.

While presently preferred embodiments of the invention have been described herein for the purpose of disclosure, numerous changes in the construction and arrangement of parts will suggest themselves to those skilled in the art, which changes are encompassed within the spirit of this invention as defined by the appended claims.

What is claimed is:

1. A method of completing a surface casing in a seafloor comprising:
    cooperatively disposing a second tubular body connected to a pipe over a first tubular body connected to a first end of a length of surface casing, whereby at least one laterally extending member connected to the exterior of the first tubular body is retained within at least one slot in the second tubular body;
    removably attaching at least one shear plate to the exterior of the second tubular body across the at least one slot to retain the at least one laterally extending member therein;
    driving a second end of the length of surface casing into the seafloor;
    rotating the second tubular body relative to the first tubular body with sufficient force to cause the at least one laterally extending member to shear the at least one shear plate; and
    removing the second tubular body from being disposed over the first tubular body.

* * * * *